US007234816B2

(12) United States Patent
Bruzzone et al.

(10) Patent No.: US 7,234,816 B2
(45) Date of Patent: Jun. 26, 2007

(54) POLARIZING BEAM SPLITTER ASSEMBLY ADHESIVE

(75) Inventors: Charles L. Bruzzone, Woodbury, MN (US); Ming Cheng, Woodbury, MN (US); Ying-Yuh Lu, Woodbury, MN (US); Jiaying Ma, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/771,863

(22) Filed: Feb. 3, 2004

(65) Prior Publication Data

US 2005/0168697 A1 Aug. 4, 2005

(51) Int. Cl.
*G03B 21/14* (2006.01)

(52) U.S. Cl. .......................... 353/20; 353/81; 359/496; 359/494

(58) Field of Classification Search .................. 353/8, 353/20, 33, 34, 81; 349/8, 9, 15; 359/464, 359/465, 490, 494–502, 831–837
See application file for complete search history.

(56) References Cited

U.S. PATENT DOCUMENTS

| 3,711,176 | A |   | 1/1973  | Alfney et al. ............ 359/359 |
|-----------|---|---|---------|----------------------------------|
| 4,243,500 | A | * | 1/1981  | Glennon ...................... 522/33 |
| 5,103,337 | A |   | 4/1992  | Schrenk et al. ........... 359/359 |
| 5,872,653 | A | * | 2/1999  | Schrenk et al. ........... 359/498 |
| 5,882,774 | A |   | 3/1999  | Jonza et al. ............... 428/212 |
| 5,962,114 | A |   | 10/1999 | Jonza et al. ............... 428/212 |
| 5,967,635 | A | * | 10/1999 | Tani et al. ................... 353/20 |
| 6,157,490 | A |   | 12/2000 | Wheatley et al. .......... 359/589 |
| 6,160,665 | A | * | 12/2000 | Yuan .......................... 359/629 |
| 6,386,710 | B2| * | 5/2002  | Kusano et al. ............... 353/81 |
| 6,486,997 | B1|   | 11/2002 | Bruzzone et al. .......... 359/247 |
| 6,523,962 | B2| * | 2/2003  | Yajima ...................... 353/121 |
| 6,557,999 | B1| * | 5/2003  | Shimizu ..................... 353/20 |
| 6,609,795 | B2|   | 8/2003  | Weber et al. ................ 353/20 |
| 6,672,721 | B2|   | 1/2004  | Aastuen et al. .............. 353/31 |
| 6,829,090 | B2| * | 12/2004 | Katsumata et al. ......... 359/486 |
| 6,840,624 | B2| * | 1/2005  | Yoneyama et al. .......... 353/20 |
| 2001/0019452 | A1 |  | 9/2001 | Epstein et al. |
| 2002/0180107 | A1 |  | 12/2002 | Jackson et al. .......... 264/288.4 |
| 2002/0190406 | A1 |  | 12/2002 | Merrill et al. ............. 264/1.7 |
| 2003/0048423 | A1 |  | 3/2003 | Aastuen et al. ............. 353/31 |
| 2004/0105078 | A1 | * | 6/2004 | Akiya ........................ 353/33 |

FOREIGN PATENT DOCUMENTS

EP          1 211 526 A1     6/2002

(Continued)

OTHER PUBLICATIONS

U.S. Appl. No. 60/294,940, filed May 31, 2001, Processes and Apparatus for Making Transversely Drawn Films with Substantially Uniaxial Character.

(Continued)

*Primary Examiner*—W. B. Perkey
*Assistant Examiner*—Andrew Sever
(74) *Attorney, Agent, or Firm*—George W. Jonas

(57) ABSTRACT

A polarizing beam splitter (PBS) includes a multilayer reflective polarizing film, a pressure sensitive adhesive is disposed on the multilayer reflective polarizing film, a first rigid cover is disposed on the pressure sensitive adhesive. The PBS can be used in a variety of applications.

17 Claims, 2 Drawing Sheets

FOREIGN PATENT DOCUMENTS

| | | |
|---|---|---|
| JP | 2002-350643 | 4/2002 |
| WO | WO 95/17303 | 6/1995 |
| WO | WO 96/19347 | 6/1996 |
| WO | WO 00/70376 | 11/2000 |

OTHER PUBLICATIONS

U.S. Appl. No. 10/306,591, filed Nov. 27, 2002, Methods and Devices for Stretching Polymer Films.

U.S. Appl. No. 10/306,593, filed Nov. 27, 2002, Methods and Devices for Processing Polymer Films.

U.S. Appl. No. 10/411,933, Apr. 11, 2003, Adhesive Blends, Articles, and Methods.

U.S. Appl. No. 10/439,444, filed May 16, 2006 having title "Polarizing Beam Splitter and Projection Systems Using the Polarizing Beam Splitter".

Handbook of Pressure Sensitive Adhesive Technology, 2d Ed., Satas, D., p. 396 (1989).

* cited by examiner

POLARIZING BEAM SPLITTER ASSEMBLY ADHESIVE

TECHNICAL FIELD

The present invention is directed generally to polarizing beam splitters and the use of such devices in, for example, systems for displaying information, and more particularly to reflective projection systems.

BACKGROUND

Optical imaging systems typically include a transmissive or a reflective imager, also referred to as a light valve or light valve array, which imposes an image on a light beam. Transmissive light valves are typically translucent and allow light to pass through. Reflective light valves, on the other hand, reflect only selected portions of the input beam to form an image. Reflective light valves provide important advantages, as controlling circuitry may be placed behind the reflective surface and more advanced integrated circuit technology becomes available when the substrate materials are not limited by their opaqueness. New potentially inexpensive and compact liquid crystal display (LCD) projector configurations may become possible by the use of reflective liquid crystal microdisplays as the imager.

Many reflective LCD imagers rotate the polarization of incident light. In other words, polarized light is either reflected by the imager with its polarization state substantially unmodified for the darkest state or with a degree of polarization rotation imparted to provide a desired grey scale. A 90° rotation provides the brightest state in these systems. Accordingly, a polarized light beam is generally used as the input beam for reflective LCD imagers. A desirable compact arrangement includes a folded light path between a polarizing beam splitter (PBS) and the imager, wherein the illuminating beam and the projected image reflected from the imager share the same physical space between the PBS and the imager. The PBS separates the incoming light from the polarization-rotated image light. A conventional PBS used in a projector system, sometimes referred to as a MacNeille polarizer, uses a stack of inorganic dielectric films placed at Brewster's angle. Light having s-polarization is reflected, while light in the p-polarization state is transmitted through the polarizer.

A single imager may be used for forming a monochromatic image or a color image. Multiple imagers are typically used for forming a color image, where the illuminating light is split into multiple beams of different color. An image is imposed on each of the beams individually, and these beams are then recombined to form a full color image.

SUMMARY

Generally, the present invention relates to an apparatus for improving performance of a projection system. In particular, the invention is based around an imaging core that includes improved image quality, stability and lifetime of a polarizing beam splitter (PBS).

The present invention provides a PBS that includes a pressure sensitive adhesive disposed between a multilayer reflective polarizing film and a rigid cover. The combination of the pressure sensitive adhesive disposed between the multilayer reflective polarizing film and the rigid cover can reduce stress-induced birefringence within the PBS assembly. In addition, the combination of the pressure sensitive adhesive disposed between the multilayer reflective polarizing film and the rigid cover can provide PBS assembly exhibiting improved image quality, improved assembly stability, and enhanced lifetime versus other adhesives.

The use of two (or more) films in the PBS construction of the present invention can decrease the haze reaching the projection screen and can be effectively formed by lamination. The two film construction may be used with any material as covers (e.g., prisms). Such materials include glass. The glass can have any index of refraction although the index typically ranges from 1.4 to 1.8 and can be in the range of 1.4 to 1.6. This lower index glass may decrease astigmatism.

One embodiment of the present invention provides a polarizing beam splitter (PBS) that includes a multilayer reflective polarizing film, a pressure sensitive adhesive disposed on the multilayer reflective polarizing film, and a first rigid cover is disposed on the pressure sensitive adhesive. An optional second rigid cover can be disposed adjacent to the multilayer reflective polarizing film. An optional structural adhesive can be disposed between the multilayer reflective polarizing film and the second rigid cover.

Another embodiment of the present invention is directed to a polarizing beam splitter (PBS) including a first multilayer reflective polarizing film and a second multilayer reflective polarizing film proximate the first multilayer reflective polarizing film. A major surface of the second multilayer reflective polarizing film faces a major surface of the first multilayer reflective polarizing film. An adhesive is disposed between the first multilayer reflective polarizing film and the second multilayer reflective polarizing film. A first pressure sensitive adhesive is disposed on the first multilayer reflective polarizing film. A first rigid cover is disposed on the pressure sensitive adhesive and a second rigid cover is disposed adjacent to the second multilayer reflective polarizing film.

Another embodiment of the present invention is directed to a projection system that includes a light source to generate light and an imaging core to impose an image on generated light from the light source to form image light. The image core includes at least one polarizing beam splitter and at least one imager. The polarizing beam splitter includes: a multilayer reflective polarizing film; a pressure sensitive adhesive disposed on the multilayer reflective polarizing film and between the light source and the multilayer reflective polarizing film; and a first rigid cover disposed on the pressure sensitive adhesive. The system further includes a projection lens system to project the image light from the imaging core.

Another embodiment of the present invention is directed to a method of making a polarizing beam splitter that includes disposing a pressure sensitive adhesive between a multilayer reflective polarizing film and a first rigid cover to form a polarizing beam splitter. The method can further include placing a second rigid cover adjacent to the multilayer reflective polarizing film. An optional structural adhesive can be disposed between the multilayer reflective polarizing film and the second rigid cover.

Another embodiment of the present invention is directed to a method of making a polarizing beam splitter that includes: disposing a first pressure sensitive adhesive between a first multilayer reflective polarizing film and a first rigid cover; disposing a second pressure sensitive adhesive between a second multilayer reflective polarizing film and a second rigid cover; and placing the first multilayer reflective polarizing film adjacent the second multilayer reflective polarizing film to form a polarizing beam splitter. An optional structural adhesive can be disposed between the first multilayer reflective polarizing film and the second multilayer reflective polarizing film.

Other features and advantages of the invention will be apparent from the following description and drawings, and from the claims.

BRIEF DESCRIPTION OF THE DRAWINGS

The invention may be more completely understood in consideration of the following detailed description of various embodiments of the invention in connection with the accompanying drawings, in which.

DETAILED DESCRIPTION

Figure 1:
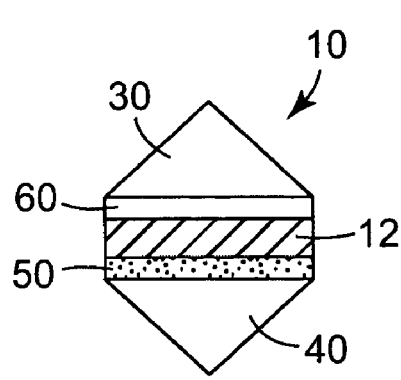
FIG. 1 schematically illustrates an embodiment of a PBS having a multilayer reflective polarizing film.

The present invention is applicable to optical imagers and is particularly applicable to large numerical aperture optical imager systems that may produce high quality, low aberration, projected images.

One exemplary type of optical image system includes a wide-angle Cartesian polarization beam splitter (PBS), as discussed in U.S. Pat. No. 6,486,997 B1, entitled REFLECTIVE LCD REFLECTION SYSTEM USING WIDE-ANGLE CARTESIAN POLARIZING BEAM SPLITTER. A Cartesian PBS is a PBS in which the polarizations of transmitted and reflected beams are referenced to invariant, generally orthogonal, principal axes of a PBS. In contrast, with a non-Cartesian PBS, the polarization of the separate beams is substantially dependent on the angle of incidence of the beams on the PBS.

An example of a Cartesian PBS is a multilayer reflective polarizing film, which can be exemplified by a film that is formed from alternating layers of isotropic and birefringent material. If the plane of the film is considered to be the x-y plane, and the thickness of the film is measured in the z-direction, then the z-refractive index is the refractive index in the birefringent material for light having an electric vector parallel to the z-direction. Likewise, the x-refractive index is the refractive index in the birefringent material for light having its electric vector parallel to the x-direction, and the y-refractive index is the refractive index in the birefringent material for light having its electric vector parallel to the y-direction. For the multilayer reflective polarizing film, the y-refractive index of the birefringent material is substantially the same as the refractive index of the isotropic material, whereas the x-refractive index of the birefringent material is different from that of the isotropic material. If the layer thicknesses are chosen appropriately, the film reflects visible light polarized in the x-direction and transmits light polarized in the y-direction.

One example of a useful multilayer reflective polarizing film is a matched z-index polarizer film, in which the z-refractive index of the birefringent material is substantially the same as the y-refractive index of the birefringent material. Polarizing films having a matched z-index have been described in U.S. Pat. Nos. 5,882,774 and 5,962,114, and in the following co-assigned U.S. Patent Applications: 60/294, 940, filed May 31, 2001; 2002-0190406, filed May 28, 2002; 2002-0180107, filed May 28, 2002; Ser. No. 10/306,591, filed Nov. 27, 2002; and Ser. No. 10/306,593, filed Nov. 27, 2002. Polarizing films having a matched z-index are also described in U.S. Pat. No. 6,609,795.

In some instances, polarizing beam splitters that use polymer based multilayer optical film (MOF) such as, for example, multilayer reflective polarizing or matched z-index polarizer films, may have stress induced birefringence within the PBS assembly and/or adhesive layers that are instable over time. For consumer applications, the durability/reliability and lifetime are some important criteria for useful PBS assemblies. The assembly of polymer based multilayer optical film (MOF) to rigid substrates is challenging to meet the environmental and lifetime requirements for useful PBS assemblies. The adhesive should have good adhesion to the MOF as well as to the rigid substrate, and in addition, not induce stress on the MOF and/or rigid substrate. PBS performance is sensitive to any stress, and even very small stress can result in degradation of the PBS performance. The adhesive properties should be balanced with those of the MOF and rigid substrate in order to achieve the maximum stability and lifetime of the PBS assembly. Structural adhesives can shrink during curing and/or cure unevenly, causing stress on the MOF and/or the rigid substrate. It is also possible that not fully cured structured adhesive undergoes gradual curing by light and heat under the normal usage condition, which can decrease the stability of the PBS. For the particular embodiment of two multilayer reflective polarizing films, more common and lead-free glass type can be used for the cover, such as SK5 made by Schott, as described in U.S. patent application Ser. No. 10/439,444 filed on May 16, 2003, entitled POLARIZING BEAM SPLITTER AND PROJECTION SYSTEM USING THE POLARIZING BEAM SPLITTER. The low index glass cover provides several important advantages over high index glass cover, such as PBH56, including reduced astigmatism, lead free, and remove the anti reflection coating on several optical surfaces. However, the lead free glass is much less stable to light, heat, and mechanical induced stress. Small mechanical induced stress in the PBS assembly process could degrade the optical performance, such as contrast and dark state uniformity. Structured cured adhesive can induce mechanical stress on lead-free glass, such as SK5, and generate birefringence causing unacceptable dark state non-uniformity. Pressure sensitive adhesive, with its low modulus and no need to be cured during assembly, can induce much less stress on the glass; therefore, can provide much improved dark state uniformity. Further, structural adhesives have a tendency to yellow and affect the optical properties of the PBS, after being exposed to high intensity light used with PBS assemblies.

Figure 3:
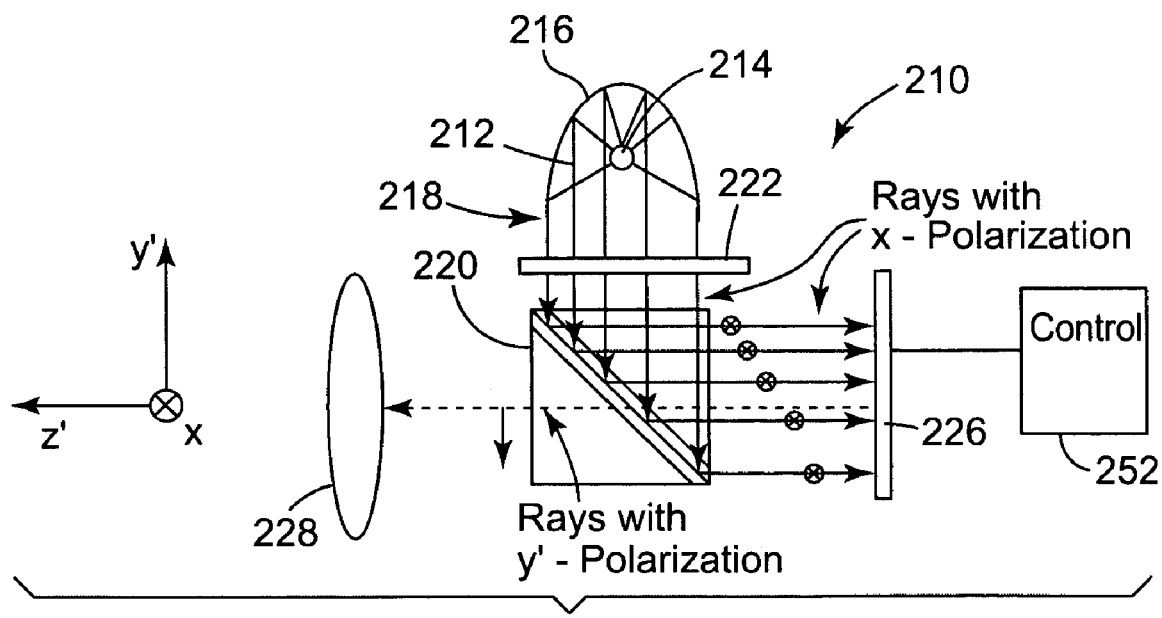
FIG. 3 schematically illustrates an embodiment of a projection unit based on a single reflective imager.

The contrast of a PBS can be defined with reference to FIG. 3, with the imager 226 replaced with a quarter wave film laminated to the front surface of a mirror. When the quarter wave film on a mirror is oriented with its optical axis at 45° to the polarization direction of the central ray of the illuminating beam it will function like a half wave film oriented at 45° to a transmitted polarized beam: i.e. it will rotate the polarization direction of the beam by 90°. Because of the previously described function of the PBS, this will result in substantially all of the light that is reflected of the quarter wave film/mirror being projected through lens 228 onto the screen. If the quarter wave film is instead oriented at 0° to the polarization state of the central ray, it will behave like a half wave film oriented with the polarization state of a transmitted beam of light and leave the polarization direction of the beam unchanged. This will result in substantially all of the light being directed back toward the light source by the PBS, without being projected to the screen by lens 228.

To measure the contrast ratio of the PBS, the bright state flux through the projection lens 228 is first characterized by orienting the quarter wave film/mirror optical axis at 45 degrees to the polarization direction of the central ray of the illuminating beam of light. This flux can be characterized by measuring illuminance of the beam at a fixed distance from the lens 228, by collecting all the projected light into an integrating sphere with a calibrated photodiode, or by other means available to those skilled in the art. The dark state is then produced by orienting the quarter wave film so that its optical axis is aligned with the polarization state of the central ray of the illuminating beam. The flux through lens 228 resulting from this state is then measured by the same technique used for characterizing the bright state flux. The ratio of bright state flux to dark state flux provides one measure of the contrast ratio, or the quarter wave film contrast ratio.

For some types of imagers, for example Ferro-electric Liquid Crystal imagers, the dark state character is very similar to that produced in the test described above. However, for most other kinds of imagers the dark state is more similar to that produced by a mirror with no quarter wave film over it. In this case, just as for the quarter wave film mirror at 0°, there is no rotation of the polarization direction of the illuminating beam, and so a dark image should be obtained. In order to test PBS performance for these sorts of imagers, it is desirable to use a pure mirror to provide the dark state, but otherwise to follow the same prescription as previously given for characterizing the contrast ratio of the PBS. The result is referred to as the mirror contrast ratio of the PBS.

The difference between the mirror contrast ratio and the quarter wave film contrast ratio has to do with the behavior of various skew rays. Some understanding of this difference can be obtained from U.S. Pat. No. 5,327,270, though that art only applies to MacNeille PBS systems and not to Cartesian PBSs. For our purposes, it is sufficient to understand that the quarter wave film mirror combination compensates for depolarization from a number of causes, and that it can be important to test both sorts of contrast to ensure good results with all kinds of imagers.

The contrast of PBS made with multilayer reflective polarizing films depends on several parameters, including, for example, index difference along the mismatched direction (e.g., x-direction), the degree of index matching in the in-plane match direction (e.g., y direction), the degree of index matching in the thickness direction (e.g., z direction), and the total number of layers of the films. The index difference between layers along the mismatched direction and the index matching along matched direction(s) are limited by the polymer resin pairs. Moreover, the polymer resins are preferably substantially transparent in the visible spectral range (or whatever spectral range will be of interest in the PBS application) from blue to green to red light. One such pair is described below in the Examples and includes polyethylene terephthalate (PET) and a copolymer of PET (coPET). These polymers are substantially transparent over the entire visible wavelength range, including the blue light. However, the index difference of these polymers along the mismatched direction is only about 0.15. To achieve a desired level of contrast in an optical system as described below, a matched z-index polarizer film using this combination of polymers typically uses a pair of high index glass prisms.

Two effects can occur when high index glass is used with the PBS film: generation of astigmatism in the PBS, and an increase in uncompensated mirror dark state brightness.

An approach to eliminating astigmatism is described in co-assigned U.S. Pat. No. 6,672,721 and U.S. Patent Application No. 2003-0048423. These describe the use of a very high index glass plate next to the film to compensate for astigmatism. However, this plate may add significant cost to the PBS. Further, use of such a plate may cause a longer back focal length and a more difficult lateral color situation for the projection lens. In addition, a PBS having a compensation plate can require a larger color combiner cube.

Further, high index PBS glass causes light to propagate at very high angles into the PBS film. If a glass with a refractive index below 1.6 is used for the PBS, then the contrast for the uncompensated mirror dark state is typically about the same as the contrast obtained with an oriented quarter wave film disposed over the mirror. As used herein, the term "uncompensated mirror dark state" is defined as the dark state obtained when a bare mirror is used in place of the imager in an imaging system, such as those described below, and the resulting light transmission through the imaging system is observed. When the index of the glass is increased to 1.85, the value of the uncompensated mirror dark state is reduced to less than half the contrast with the quarter wave film disposed over the mirror, particularly when an index matching layer is used to match the high birefringence glass prisms to the multilayer reflective polarizing film and thereby reduce reflections. This loss in contrast can be reclaimed by placing a quarter wave film over the mirror or imager that is aligned with its fast axis along the polarization direction of the incoming light. However, these special compensation plates (e.g., quarter wave film) may increase cost and can be difficult to align properly. Therefore, a technique for using a PBS film in a low index glass (e.g., n<1.60) would decrease cost by eliminating the need for mirror dark state compensation plates such as quarter wave film.

An approach to eliminating haze in a PBS assembly is described in co-assigned U.S. patent application Ser. No. 10/439,444, filed May 16, 2003, entitled POLARIZING BEAM SPLITTER AND PROJECTION SYSTEM USING THE POLARIZING BEAM SPLITTER. This reference describes the use of two multilayer reflective polarizing films in a PBS assembly to reduce haze.

FIG. 1 illustrates one embodiment of a polarizing beam splitter 10 that utilizes a multilayer reflective polarizing film according to the present invention. In this embodiment, polarizing beam splitter 10 includes a multilayer reflective polarizing film 12. The film 12 may be any suitable multilayer reflective polarizing film known in the art, preferably a matched z-index polarizer film. A pressure sensitive adhesive (PSA) 60 is disposed on the multilayer reflective polarizing film 12. A first rigid cover 30 is disposed on the pressure sensitive adhesive 60. A second rigid cover 40 is adjacent to the multilayer reflective polarizing film 12. An adhesive layer 50 can be disposed between the second rigid cover 40 and the multilayer reflective polarizing film 12. The adhesive layer can be a structural adhesive.

Although depicted as including two prisms 30 and 40, the PBS 10 may include any suitable cover(s) disposed on one or either side of the multilayer reflective polarizing film 12. The prisms 30 and 40 can be constructed from any light transmissive material having a suitable refractive index to achieve the desired purpose of the PBS. The prisms should have refractive indices less than that which would create a total internal reflection condition, i.e., a condition where the propagation angle approaches or exceeds 90° under normal usage conditions (e.g., where incident light is normal to one face of the prism). Such condition can be calculated using Snell's law. Preferably, the prisms are made of isotropic materials, although other materials can be used. A "light transmissive" material is one that allows at least a portion of incident light from the light source to transmit through the material. In some applications, the incident light can be pre-filtered to eliminate undesirable wavelengths. Suitable materials for use as prisms include, but are not limited to, ceramics, glass, and polymers. A particularly useful category of glass includes glasses containing a metallic oxide such as lead oxide. A commercially available glass is PBH 55, available from Ohara Corporation (Rancho Santa Margarita, Calif., USA), having a refractive index of 1.85 and having about 75% lead oxide by weight.

The PBS assembly 10 can have a high light intensity rigid cover 30 and a lower light intensity rigid cover 40. The high light intensity rigid cover 30 is the rigid cover that is closest to the light source (see FIGS. 3 and 4). The high light intensity rigid cover 30 experiences light at a higher intensity than the lower light intensity rigid cover 40. It is desirable to place the pressure sensitive adhesive 60 between this high light intensity rigid cover 30 and the multilayer reflective polarizing film 12. The optical and physical properties of a pressure sensitive adhesive, as described below, allow the pressure sensitive adhesive to remain stable under high intensity light. The adhesive layer 50 can be either a structural adhesive or a pressure sensitive adhesive.

Figure 2:
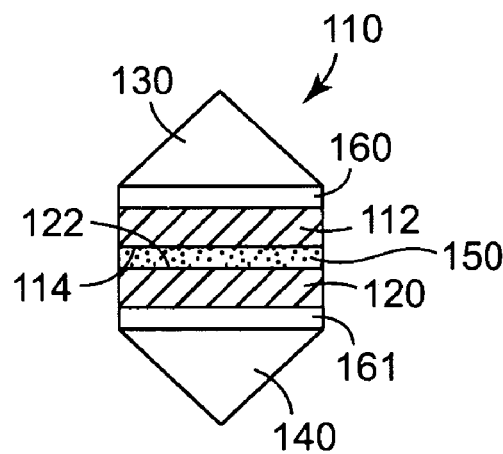
FIG. 2 schematically illustrates an embodiment of a PBS having two multilayer reflective polarizing films.

FIG. 2 illustrates one embodiment of a polarizing beam splitter 110 that uses two or more multilayer reflective polarizing (multilayer reflective polarizing) films according to the present invention. In this embodiment, polarizing beam splitter 110 includes a first multilayer reflective polarizing film 112, a second multilayer reflective polarizing film 120, and an adhesive layer 150 between the first film 112 and the second film 120. One or both of the first and second films 112 and 120 may be any suitable multilayer reflective polarizing film known in the art, preferably matched z-index polarizer films. The adhesive layer 150 can be a structural adhesive. Although PBS 110 includes first and second films 112 and 120 respectively, three or more films may also be utilized. A first pressure sensitive adhesive 160 is disposed on the first multilayer reflective polarizing film 112. A second pressure sensitive adhesive or adhesive layer 161 is disposed on the second multilayer reflective polarizing film 120. A first rigid cover 130 is disposed on the first pressure sensitive adhesive 160. A second rigid cover 140 is disposed on the second pressure sensitive adhesive or adhesive layer 161.

Although depicted as including two prisms 130 and 140, the PBS 110 may include any suitable cover(s) disposed on one or either side of the first and second multilayer reflective polarizing films 112 and 120. The prisms 130 and 140 can be constructed from any light transmissive material having a suitable refractive index to achieve the desired purpose of the PBS. The prisms should have refractive indices less than that which would create a total internal reflection condition, i.e., a condition where the propagation angle approaches or exceeds 90° under normal usage conditions (e.g., where incident light is normal to one face of the prism). Such condition can be calculated using Snell's law. Preferably, the prisms are made of isotropic materials, although other materials can be used. A "light transmissive" material is one that allows at least a portion of incident light from the light source to transmit through the material. In some applications, the incident light can be pre-filtered to eliminate undesirable wavelengths. Suitable materials for use as prisms include, but are not limited to, ceramics, glass, and polymers. A lower index material may be used for prisms 30 and 40, e.g., SK5 glass made by Schott Corporation (Mainz, Germany) particularly when two or more films are utilized.

The PBS assembly 110 can have a high light intensity rigid cover 130 and a lower light intensity rigid cover 140. The high light intensity rigid cover 130 is the rigid cover that is closest to the light source (see FIGS. 3 and 4). The high light intensity rigid cover 130 experiences light at a higher intensity than the lower light intensity rigid cover 140. It is desirable to place the pressure sensitive adhesive 160 between this high light intensity rigid cover 130 and the multilayer reflective polarizing film 112. The optical and physical properties of a pressure sensitive adhesive, as described below, allow the pressure sensitive adhesive to remain stable under high intensity light. The adhesive layer 150 can be either a structural adhesive or a pressure sensitive adhesive. The adhesive layer 161 can be either a structural adhesive or a pressure sensitive adhesive.

Pressure sensitive adhesives (PSA) are known to those of ordinary skill in the art. Useful pressure sensitive adhesives can be, for example, substantially free of unreacted monomers and oligomers and/or photo initiators, and substantially non-shrinking. The PSA materials preferably are substantially free of UV-absorbing chromophores such as extended aromatic structures or conjugated double bonds. The Pressure-Sensitive Tape Council (Test Methods for Pressure Sensitive Adhesive Tapes (1994), Pressure Sensitive Tape Council, Chicago, Ill.) has defined pressure sensitive adhesives as material with the following properties: (1) aggressive and permanent tack, (2) adherence with no more than finger pressure, (3) sufficient ability to hold onto an adherand, (4) sufficient cohesive strength, and (5) requires no activation by an energy source, PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly aipha-olefin-, and various (meth) acrylate- (e.g., acrylate and methacrylate) based polymers. Of these, (meth)acrylate-based polymer PSAs have evolved as a preferred class of PSA for the present invention due to their optical clarity, permanence of properties over time (aging stability), and versatility of adhesion levels, to name just a few of their benefits. It is known to prepare PSAs comprising mixtures of certain (meth)acrylate-based polymers with certain other types of polymers. Suitable pressure sensitive adhesives include, but not limited to, Soken 1885, 2092, 2137 PSAs (commercially available from Soken Chemical & Engineering Co., Ltd, Japan) and the PSAs described in the U.S. patent application Ser. No. 10/411,933, filed Apr. 11, 2003, entitled ADHESIVE BLENDS, ARTICLES, AND METHODS, published Oct. 14, 2004, as U.S. Patent Publication No. 2004-0202879A1.

A structural adhesive is a material used to bond high strength materials, such as wood, composites, plastics, glass, or metal, so that the practical adhesive bond strength is in excess of 6.9 MPa (1000 psi) at room temperature. Because of the demands on performance, structural adhesives usually take part in curing and/or crosslinking reaction by external energy source such as UV or heat during assembly leading to the development of final adhesive properties (Structural Adhesives—Chemistry and Technology, Edited by S. R. Hartshorn, 1986). Structural adhesives may be classified in a number of ways, such as physical form, chemical compositions, and curing conditions of the adhesives. Examples of structural adhesives commonly encountered are phenolic, epoxy, acrylic, urethane, polyimide and bis-maleimide, as described in the book of Adhesion and Adhesives Technology—An Introduction, page 184, A. V. Pocius, 1997.

Suitable multilayer reflective polarizing films include, for example, those described in U.S. Pat. No. 5,882,774. One embodiment of a suitable multilayer reflective polarizing film includes alternating layers of two materials, at least one of which is birefringent and oriented. Films which function well in glass prisms can have additional features to provide appropriate values of the indices of refraction for each layer, especially in the direction normal to the surface of the film. Specifically, the indices of refraction in the thickness direction of the film of the alternating layers are ideally matched. This is in addition to the indices in the y-direction (pass direction) of the polarizer being matched. For a polarizer to have high transmission along its pass axis for all angles of incidence, both the y and z (normal to the film) indices of the alternating layers may be matched. Achieving a match for both the y and z indices may utilize a different material set for the layers of the film than that used when only the y index is matched. Older 3M multi-layer films, such as 3M brand "DBEF" film, were made in the past with a match of the y indices.

Surprisingly, the use of a PSA layer between the multilayer reflective polarizing film and the high intensity light side of the PBS assembly improves the optical properties and lifetime of the PBS assembly even with a structural adhesive disposed between the multilayer reflective polarizing film and the low intensity light side and/or between dual multilayer reflective polarizing films. Suitable structural adhesives include, for example: NOA61, a UV cured thiol-ene based adhesive available from the Norland Company (Cranbury, N.J.); Loctite series (e.g., 3492, 3175) UV cured acrylic adhesives available from Henkel Loctite Corp., 1001 Trout Brook Crossing, Rocky Hill, Conn. 06067 (www.loctite.com). OP series (e.g., 21, 4-20632, 54, 44) UV cured acrylic adhesives available from Dymax Corporation, 51 Greenwoods Road, Torrington, Conn., 06790 (http://www.dymax.com/).

One technique for matching both the y and z indices of all the layers is to impart a true uniaxial stretch where the film is allowed to relax (i.e., shrink) in both the y and z directions while it is being stretched in the x direction. When the film is stretched in such a manner, the y and z indices of refraction are the same in a given layer. It then follows that if a second material is chosen that matches the y index of the first material, the z indices must also match because the second material layers are also subjected to the same stretching conditions.

In general, the mismatch in index between the y indices of the two materials should be small for high transmission in the pass state while maintaining high reflectance in the block state. The allowed magnitude of the y index mismatch can be described relative to the x index mismatch because the latter value suggests the number of layers used in the polarizer thin film stack to achieve a desired degree of polarization. The total reflectivity of a thin film stack is correlated with the index mismatch $\Delta n$ and the number of layers in the stack N, i.e., the product $(\Delta n)^2 \times N$ correlates to the reflectivity of a stack. For example, to provide a film of the same reflectivity but with half the number of layers requires $(2)^{1/2}$ times the index differential between layers, and so forth. The absolute value of the ratio $\Delta n_Y/\Delta n_X$ is the relevant parameter that is desirably controlled, where $\Delta n_Y = n_{Y1} - n_{Y2}$ and $\Delta n_X = n_{X1} - n_{X2}$ for first and second materials in an optical repeat unit as described herein. It is preferred that the absolute value of the ratio of $\Delta n_Y/\Delta n_X$ is no more than 0.1, more preferably no more than 0.05, and even more preferably no more than 0.02, and, in some instance, this ratio can be 0.01 or less. Preferably, the ratio $\Delta n_Y/\Delta n_X$ is maintained below the desired limit over the entire wavelength range of interest (e.g., over the visible spectrum). Typically, $\Delta n_X$ has a value of at least 0.1 and can be 0.14 or greater.

In many practical applications, a small z index mismatch between these layers is acceptable, depending on the angle the incident light makes to the film layers. However, when the film is laminated between glass prisms, i.e., immersed in a high index medium, the light rays are not bent toward the normal to the film plane. In this case, a light ray will sense the z index mismatch to a much greater degree compared to incidence from air, and a light ray of x-polarized light will be partially or even strongly reflected. A closer z index match may be preferred for light rays having a greater angle to the film normal inside the film. However, when the film is laminated between glass prisms having a lower index of refraction (e.g., n=1.60), the light rays are bent more toward the normal to the film plane; therefore, the light rays will sense the z index mismatch to a lesser degree. With the same z index mismatch, reflection of p-polarized light will be generally lower when using low index prisms than when using high index prisms. Transmission of p-polarized light, therefore, may be higher when using low index prisms than when using a high index prism with the same films.

The allowed magnitude of the z index mismatch, like the y index mismatch, can be described relative to the x index mismatch. The absolute value of the ratio of $\Delta n_Z/\Delta n_X$ is the relevant parameter that is desirably controlled, where $\Delta n_Z = n_{Z1} - n_{Z2}$ and $\Delta n_X = n_{X1} - n_{X2}$ for first and second materials in an optical repeat unit as described herein. For a beam splitter film intended for use in air, the absolute value of the ratio $\Delta n_Z/\Delta n_X$ is preferably less than 0.2. For film immersed in a higher index medium such as glass, the absolute value of the ratio $\Delta n_Z/\Delta n_X$ is preferably less than 0.1 and more preferably less than 0.05, and can be 0.03 or lower for incident light having a wavelength at 632.8 nm. Preferably, the ratio $\Delta n_Z/\Delta n_X$ is maintained below the desired limit over the entire wavelength range of interest (e.g., over the visible spectrum). Typically, $\Delta n_X$ has a value of at least 0.1 and can be 0.14 or greater at 632.8 nm.

The z index mismatch is irrelevant for the transmission of nominally s-polarized light. By definition, nominally s-polarized light does not sense the z-index of refraction of a film. However, as described in co-assigned U.S. Pat. No. 6,486,997 B1, entitled REFLECTIVE LCD PROJECTION SYSTEM USING WIDE-ANGLE CARTESIAN POLARIZING BEAM SPLITTER, the reflective properties of birefringent multilayer polarizers at various azimuthal angles are such that projection system performance is superior when the PBS is configured to reflect x-polarized (approximately s-polarized) light and transmit y-polarized (approximately p-polarized) light. The optical power or integrated reflectance of a multilayer optical film is derived from the index mismatch within an optical unit or layer pair, although more than two layers may be used to form the optical unit. The use of multilayer reflective films including alternating layers of two or more polymers to reflect light is known and is described, for example, in U.S. Pat. No. 3,711,176; U.S. Pat. No. 5,103,337; WO 96/19347; and WO 95/17303. The placement of this optical power in the optical spectrum is a function of the layer thicknesses. The reflection and transmission spectra of a particular multilayer film depends primarily on the optical thickness of the individual layers, which is defined as the product of the actual thickness of a layer and its refractive index. Accordingly, films can be designed to reflect infrared, visible, or ultraviolet wavelengths $\lambda_M$ of light by choice of the appropriate optical thickness of the layers in accordance with the following formula:

$$\lambda_M = (2/M)*D_r$$

wherein M is an integer representing the particular order of the reflected light and $D_r$ is the optical thickness of an optical repeating unit, which is typically a layer pair including one layer of an isotropic material and one layer of an anisotropic material. Accordingly, $D_r$ is the sum of the optical thicknesses of the individual polymer layers that make up the optical repeating unit. $D_r$, therefore, is one half lambda in thickness, where lambda is the wavelength of the first order reflection peak. In general, the reflectance peak has finite band width, which increases with increasing index difference. By varying the optical thickness of the optical repeating units along the thickness of the multilayer film, a multilayer film can be designed that reflects light over a broad band of wavelengths. This band is commonly referred to as the reflection band or stop band. The collection of layers resulting in this band is commonly referred to as a multilayer stack. Thus, the optical thickness distribution of the optical repeat units within the multilayer film is manifested in the reflection and transmission spectra of the film. When the index matching is very high in the pass direction, the pass state transmission spectrum can be nearly flat and over 95% in the desired spectral range.

Various thickness distributions of optical thicknesses can be used in the films of the present invention. For example, the thickness distributions of one or both of the films can vary monotonically. In other words, the thickness of the optical repeating unit either shows a consistent trend of decreasing or increasing along the thickness of the multilayer reflective polarizing film (e.g., the thickness of the optical repeating unit does not show an increasing trend along part of the thickness of the multilayer film and a decreasing trend along another part of the multilayer film thickness).

Returning to FIG. 2, the first film 112 includes a plurality of layers that has a first distribution of optical thicknesses. Further, the second film 120 includes a plurality of layers that has a second distribution of optical thicknesses. The first and second distributions of optical thicknesses may be any suitable distributions known in the art. For example, the first and second distributions may include such distributions as those described in U.S. Pat. No. 6,157,490 entitled OPTICAL FILM WITH SHARPENED BANDEDGE. Further, for example, the first distribution may exhibit the same distribution of optical thicknesses as the second distribution. Alternatively, the first and second distributions may exhibit different distributions of optical thicknesses.

The multilayer reflective polarizing films useful in the present invention may include thickness distributions that include one or more band packets. A band packet is a multilayer stack having a range of layer thickness such that a wide band of wavelengths is reflected by the multilayer stack. For example, a blue band packet may have an optical thickness distribution such that it reflects blue light, i.e., approximately 400 nm to 500 nm. Multilayer reflective polarizing films of the present invention may include one or more band packets each reflecting a different wavelength band, e.g., an multilayer reflective polarizer having a red, green, and blue packet. Multilayer reflective polarizing films useful in the present invention may also include UV and/or IR band packets as well. In general, blue packets include optical repeat unit thicknesses such that the packet tends to reflect blue light and, therefore, will have optical repeat unit thicknesses that are less than the optical repeat unit thicknesses of the green or red packets. The band packets can be separated within a multilayer reflective polarizing film by one or more internal boundary layers.

Increasing the angle of incidence of light on a multilayer stack can cause the stack to reflect light of a shorter wavelength than when the light is incident normal to the stack. An IR packet may be provided to aid in reflecting red light for those rays that are incident on the stack at the highest angles.

As described in, for example, U.S. Pat. Nos. 5,882,774 and 5,962,114, multilayer reflective polarizing films have unique transmission or reflection spectra. As a result, the different multilayer reflective polarizing films can exhibit different contrast ratios for different incident wavelengths and polarizations, where the contrast ratio is defined as the ratio of transmitted intensities of the light with the desired transmission polarization (e.g., p-polarized light) over the light with the desired reflection polarization (e.g., s-polarized light). For example, the first film 112 may have a first contrast ratio spectrum, first transmission spectrum, or first reflection spectrum, and the second film 120 may have a second contrast ratio spectrum, second transmission spectrum, or second reflection spectrum. The first contrast ratio spectrum, first transmission spectrum, or first reflection spectrum may coincide with the second contrast ratio spectrum, second transmission spectrum, or second reflection spectrum, respectively, for a give wavelength band. Alternatively, the first contrast ratio spectrum, first transmission spectrum, or first reflection spectrum may be different from (and in some cases, spectrally shifted from) the second contrast ratio spectrum, second transmission spectrum, or second reflection spectrum, respectively, as is further described herein.

As is further illustrated in FIG. 2, the second film 120 is placed proximate the first film 112 such that a major surface 122 of the second film 120 faces a major surface 114 of the first film 112. The major surfaces 114 and 122 of the first and second films 112 and 120 that face each other may be in contact, or the major surfaces may be spaced apart with an adhesive layer 150 disposed between the first film 112 and the second film 120. The major surfaces 114 and 122 may be parallel as illustrated in FIG. 2.

Adhesive layer 50 and 150 may include an optical adhesive. Any suitable optical adhesive may be used, e.g., thermally cured structural adhesive, photo cured structural adhesive, pressure sensitive adhesive, etc.

For some multilayer reflective polarizing films, optical absorption may cause undesirable effects. To reduce optical absorption, the preferred multilayer stack is constructed such that wavelengths that would be most strongly absorbed by the stack are the first wavelengths reflected by the stack. For most clear optical materials, including most polymers, absorption increases toward the blue end of the visible spectrum. Thus, it may be preferred to tune the multilayer reflective polarizing film stack such that the "blue" layers, or packets, are on the incident side of the multilayer reflective polarizing film.

Although the present invention provides polarizing beam splitters that include one or more multilayer reflective polarizing films with a pressure sensitive adhesive disposed between a multilayer reflective polarizing film and rigid cover, and systems using such polarizing beam splitters, one or more multilayer reflective polarizing films disposed on a pressure sensitive adhesive can be used in other configurations or optical devices, e.g., brightness enhancement film constructions, polarizers, display applications, projection applications, and other optoelectronic applications. This combination of one or more multilayer reflective polarizing films disposed on a pressure sensitive adhesive can be used in general to increase the optical stability of PBS assemblies.

One embodiment of the present invention may include a PBS having substantially right angle triangular prisms used to form a cube. In this case, the multilayer reflective polarizing film(s) are sandwiched between the hypotenuses of the two prisms, as described herein. A cube-shaped PBS may be preferred in many projection systems because it provides for a compact design, e.g., the light source and other components, such as filters, can be positioned so as to provide a small, light-weight, portable projector.

Although a cube is one embodiment, other PBS shapes can be used. For example, a combination of several prisms can be assembled to provide a rectangular PBS. For some systems, the cube-shaped PBS may be modified such that one or more faces are not square. If non-square faces are used, a matching, parallel face can be provided by the next adjacent component, such as the color prism or the projection lens.

The prism dimensions, and the resulting PBS dimensions, depend upon the intended application. In an illustrative three panel liquid crystal on silicon (LCOS) light engine described herein in reference to FIG. 4, the PBS can be 17 mm in length and width, with a 24 mm height when using a small arc high pressure Hg type lamp, such as the UHP type sold commercially by Philips Corp. (Aachen, Germany), with its beam prepared as an F/2.3 cone of light and presented to the PBS cubes for use with 0.7 inch diagonal imagers with 16:9 aspect ratio, such as the imagers available from JVC (Wayne, N.J., USA), Hitachi (Fremont, Calif., USA), or Three-Five Systems (Tempe, Ariz., USA). The F# of the beam and imager size are some of the factors that determine the PBS size.

A single layer multilayer reflective polarizing PBS assembly can be formed by the following method. A pressure sensitive adhesive can be disposed (coated or laminated, for example) between a multilayer reflective polarizing film and a rigid cover. The pressure sensitive adhesive can be disposed (coated or laminated, for example) on either the multilayer reflective polarizing film or the rigid cover. The pressure sensitive adhesive can be flexible enough such that the PSA can be deflected while being applied to the multilayer reflective polarizing film and/or the rigid cover. Laminating or coating the PSA on the multilayer reflective polarizing film and/or the rigid cover can, in some embodiments, prevent noticeable air voids from forming between the PSA and the multilayer reflective polarizing film and/or rigid cover. In an illustrative embodiment, the PSA can be disposed on the multilayer reflective polarizer to form an adhesive polarizing film laminate. The adhesive polarizing film laminate can then be applied onto a first rigid cover. A second rigid cover can be placed adjacent to the adhesive polarizing film laminate to form a polarizing beam splitter. An optional structural adhesive can be disposed between the adhesive polarizing film laminate and the second rigid cover.

The above PBS assembly can be formed without curing (photo curing or thermal curing, for example) of the pressure sensitive adhesive. However, if an optional structural adhesive is used to adhere the multilayer reflective polarizing film to the second rigid cover, that structural adhesive can be cured with heat or light as desired.

A two-layer multilayer reflective polarizing PBS assembly can be formed by the following method. A first pressure sensitive adhesive can be disposed (coated or laminated, for example) between a first multilayer reflective polarizing film and a first rigid cover, as described above. A second pressure sensitive adhesive can be disposed (coated or laminated, for example) between a second multilayer reflective polarizing film and a second rigid cover, as described above. The first multilayer reflective polarizing film is then placed adjacent the second multilayer reflective polarizing film to form a polarizing beam splitter. An optional structural adhesive can be disposed between the first multilayer reflective polarizing film and the second multilayer reflective polarizing film.

The above PBS assembly can be formed without curing (photo curing or thermal curing, for example) of the pressure sensitive adhesive. However, if an optional structural adhesive is used to adhere the second multilayer reflective polarizing film to the second rigid cover or the first multilayer reflective polarizing film to the second multilayer reflective polarizing film, that structural adhesive can be cured with heat or light as desired.

The pressure sensitive adhesive described herein can be flexible, deflectable or curved to a radius usable with lamination and may be effective to prevent noticeable air voids from forming between the lamination layers i.e., from 0.5 to 5 mm.

The multi-film PBS of the present invention may be used in various optical imager systems. The term "optical imager system" as used herein is meant to include a wide variety of optical systems that produce an image for a viewer to view. Optical imager systems of the present invention may be used, for example, in front and rear projection systems, projection displays, head-mounted displays, virtual viewers, heads-up displays, optical computing systems, optical correlation systems, and other optical viewing and display systems.

One embodiment of an optical imager system is illustrated in FIG. 3, where system 210 includes a light source 212, for example an arc lamp 214 with a reflector 216 to direct light 218 in a forward direction. The light source 212 may also be a solid state light source, such as light emitting diodes or a laser light source. The system 210 also includes a PBS 220, e.g., the single or multi-film PBS described herein. Light with x-polarization, i.e., polarized in a direction parallel to the x-axis, is indicated by the circled x. Light with y-polarization, i.e., polarized in a direction parallel to the y-axis, is indicated by a solid arrow. Solid lines indicate incident light, while dashed lines indicate light that has been returned from a reflective imager 226 with a changed polarization state. Light provided by the source 212 can be conditioned by conditioning optics 222 before illuminating the PBS 220. The conditioning optics 222 change the characteristics of the light emitted by the source 212 to characteristics that are desired by the projection system. For example, the conditioning optics 222 may alter any one or more of the divergence of the light, the polarization state of the light, the spectrum of the light. The conditioning optics 222 may include, for example, one or more lenses, a polarization converter, a pre-polarizer, and/or a filter to remove unwanted ultraviolet or infrared light.

The x-polarized components of the light are reflected by the PBS 220 to the reflective imager 226. The liquid crystal mode of reflective imager 226 may be smectic, nematic, or some other suitable type of reflective imager. If the reflective imager 226 is smectic, the reflective imager 226 may be a ferroelectric liquid crystal display (FLCD). The imager 226 reflects and modulates an image beam having y-polarization. The reflected y-polarized light is transmitted through the PBS 220 and is projected by a projection lens system 228, the design of which is typically optimized for each particular optical system, taking into account all the components between the lens system 228 and the imager(s). A controller 252 is coupled to the reflective imager 226 to control the operation of the reflective imager 226. Typically, the controller 252 activates the different pixels of the imager 226 to create an image in the reflected light.

Figure 4:
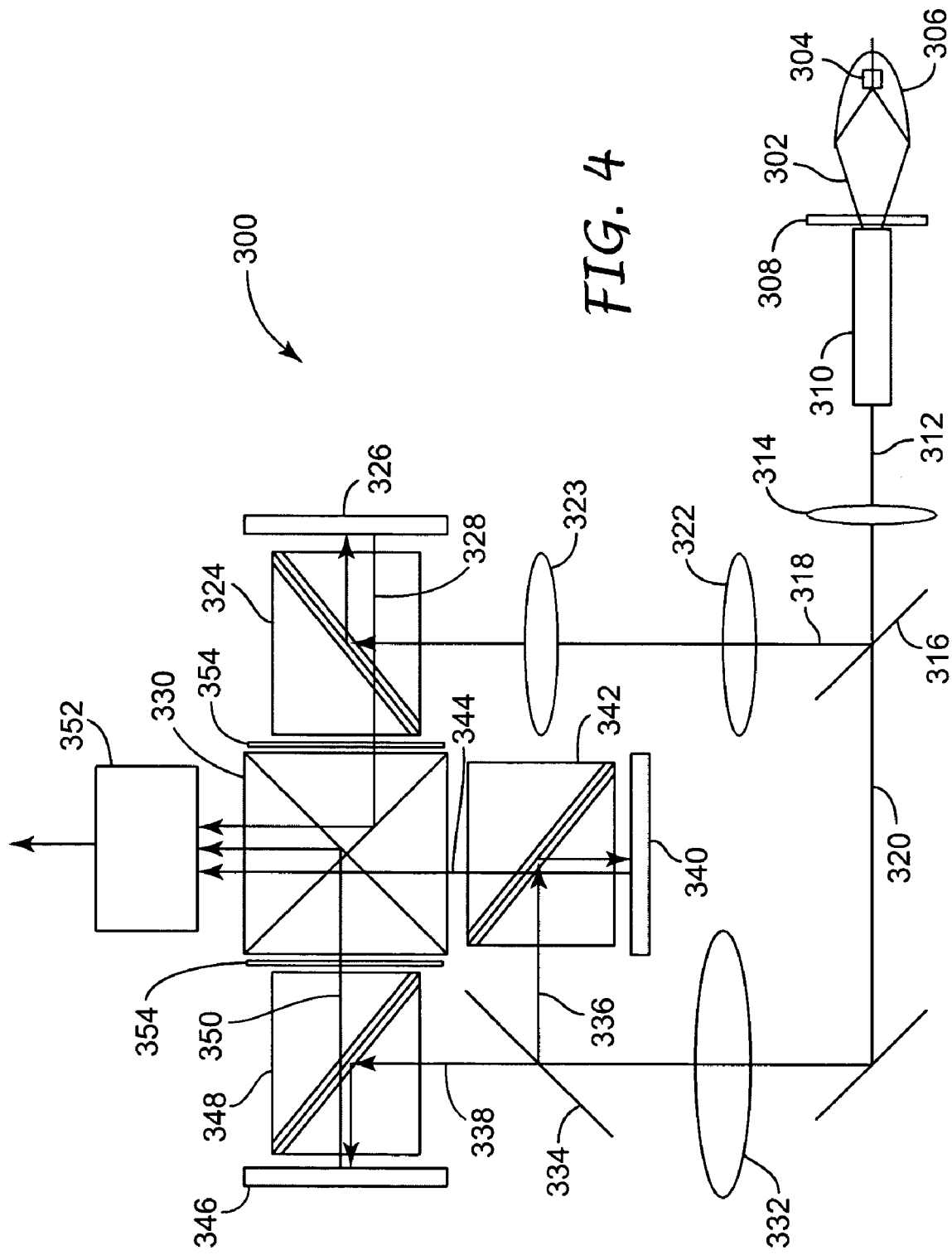
FIG. 4 schematically illustrates another embodiment of a projection unit based on multiple reflective imagers.

An embodiment of a multi-imager projection system 300 is schematically illustrated in FIG. 4. Light 302 is emitted from a source 304. The source 304 may be an arc or filament lamp, or any other suitable light source for generating light suitable for projecting images. The source 304 may be surrounded by a reflector 306, such as an elliptic reflector (as shown), a parabolic reflector, or the like, to increase the amount of light directed towards the projection engine.

The light 302 is typically treated before being split into different color bands. For example, the light 302 may be passed through an optional pre-polarizer 308, so that only light of a desired polarization is directed towards the projection engine. The pre-polarizer may be in the form of a reflective polarizer, so that reflected light, in the unwanted polarization state, is redirected to the light source 304 for re-cycling. The light 302 may also be homogenized so that the imagers in the projection engine are uniformly illuminated. One approach to homogenizing the light 302 is to pass the light 302 through a reflecting tunnel 310, although it will be appreciated that other approaches to homogenizing the light may also be employed.

In the illustrated embodiment, the homogenized light 312 passes through a first lens 314 to reduce the divergence angle. The light 312 is then incident on a first color separator 316, which may be, for example, a dielectric thin film filter. The first color separator 316 separates light 318 in a first color band from the remaining light 320.

The light 318 in the first color band may be passed through a second lens 322, and optionally a third lens 323, to control the size of the light beam 318 in the first color band incident on the first PBS 324. The light 318 passes from the first PBS 324 to a first imager 326. The imager reflects image light 328 in a polarization state that is transmitted through the PBS 324 to an x-cube color combiner 330. The imager 326 may include one or more compensation elements, such as a retarder element, to provide additional polarization rotation and thus increase contrast in the image light.

The remaining light 320 may be passed through a third lens 332. The remaining light 320 is then incident on a second color separator 334, for example a thin film filter or the like, to produce a light beam 336 in a second color band and a light beam 338 in a third color band. The light 336 in the second color band is directed to a second imager 340 via a second PBS 342. The second imager 340 directs image light 344 in the second color band to the x-cube color combiner 330.

The light 338 in the third color band is directed to a third imager 346 via a third PBS 348. The third imager 346 directs image light 350 in the third color band to the x-cube color combiner 330.

The image light 328, 344 and 350 in the first, second and third color bands is combined in the x-cube color combiner 330 and directed as a full color image beam to projection optics 352. Polarization rotating optics 354, for example half-wave retardation plates or the like, may be provided between the PBSs 324, 342 and 348 and the x-cube color combiner 330 to control the polarization of the light combined in the x-cube color combiner 330. In the illustrated embodiment, polarization rotating optics 354 are disposed between the x-cube color combiner 330 and the first PBS 324 and third PBS 348. Any one, two, or all three of PBSs 324, 342, and 348 may include one or more multilayer reflective polarizing films as described herein.

It will be appreciated that variations of the illustrated embodiment may be used. For example, rather than reflect light to the imagers and then transmit the image light, the PBSs may transmit light to the imagers and then reflect the image light. The above described projection systems are only examples; a variety of systems can be designed that utilize the multifilm PBSs of the present invention.

EXAMPLES

The multilayer reflective polarizing films of the following examples are similar in construction and processing, essentially varying only through their final thickness and through secondary variations resulting from the use of different casting speeds needed to achieve these varying thicknesses at constant melt pumping rates. The films were extruded and drawn in accordance with the general methods described in U.S. Pat. No. 6,609,795 and in accordance with the general methods described in U.S. patent application Ser. No. 10/439,444, filed May 16, 2003, entitled POLARIZING BEAM SPLITTER AND PROJECTION SYSTEM USING THE POLARIZING BEAM SPLITTER.

Acrylic PSAs used in the following examples are Soken 1885 PSA (commercially available from Soken Chemical & Engineering Co., Ltd, Japan) and NEA PSA described in the Example 1 of U.S. patent application Ser. No. 10/411,933, filed Apr. 11, 2003, entitled ADHESIVE BLENDS, ARTICLES, AND METHODS. The Soken 1885 PSA is received as a 20% solids solution in Ethyl Acetate/Toluene/ MEK solvent mixture. After being compounded with the crosslinkers L-45 and E-5XM (also from Soken Co.) at a ratio recommended by Soken of Soken1885/L-45/E-5XM=1 Kg/1.78 g/0.64 g., the Soken PSA solution is ready for coating to make the Soken 1885 PSA film for lamination. The NEA PSA was prepared according to the Example 1 of U.S. patent application Ser. No. 10/411,933, for coating to make the NEA PSA film for lamination.

Structural adhesives used in the following examples are all commercially available as indicated below. Lens Bond (Type C59) is a thermally cured styrene based adhesive available from Summers Optical, 1560 Industry Road, P.O. Box 380, Hatfield, Pa. 19440 (A Division of EMS Acquisition Corp., http://www.emsdiasum.com/Summers/optical/ cements/cements/cements.html). NOA61 is a UV cured thiol-ene based adhesive, which is available from Norland Company (Cranbury, N.J.). NOA61 Thermal is a UV cured NOA61 adhesive mixing with 0.5% 2,2'-azobis(2,4-dimethyl-valeronitrile), commercially available from DuPont, Wilmington, Del., under the trade designation "Vazo 52".

A number of film/adhesive PBS constructions were made according to the following procedure.

Procedures to Make PBS Optical Core Using PSA Film and Structural Adhesive:

1. The above Soken 1885 PSA solution and NEA PSA solution were coated by a knife coater onto a release liner (A31 liner from LINTEC OF AMERICA, INC., 64 Industrial Parkway, Woburn, Mass. 01888 U.S.A.) and heat dried in a 70 degree C. oven for 10 minutes to a dry thickness of 25 um for the respective PSA layers. Crosslinking reactions in the PSAs were completed during drying. No further reaction is required for the PSA films during assembly, e.g. in the Steps 2 and 3.

2. Samples of the coated PSA films were then laminated to PBS film using a laminator and then cut to a specific size for laminating to rigid glass prism.
3. The die cut multilayer reflective polarizing backed PSA films were bonded to the rigid glass prism by a hand roller.
4. For a single multilayer reflective polarizing layer PBS optical core, the multilayer reflective polarizing/PSA/Prism construction was then attached to another prism by a structural adhesive. The adhesive was thermally cured at 60 degree C. for 24 hours.
5. For a two layer multilayer reflective polarizing PBS optical core, the multilayer reflective polarizing/PSA/Prism construction was then attached to another multilayer reflective polarizing/PSA/Prism construction by a structure adhesive. The structural adhesive was cured by a low intensity blacklight (UVA: 7.5 mW/cm$^2$) for 10 minutes. The total exposure dose is 4.5 J/cm$^2$.

The above procedure was performed to form single and two layer multilayer reflective polarizing PBS optical cores. PBS cores having a pressure sensitive adhesive disposed between the prism and the multilayer reflective polarizing film are found to have an improved lifetime by at least a factor of 2× as compared to similar constructions having a structural adhesive disposed between the prism and the multilayer reflective polarizing film. In addition, these inventive PBS cores exhibit more uniform mirror dark state as compared to similar constructions where a structural adhesive is disposed between the prism and the multilayer reflective polarizing film.

All references and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of this invention, and it should be understood that this invention is not limited to the illustrative embodiments set forth herein. Accordingly, the invention is to be limited only by the claims provided below.

What is claimed is:

1. A polarizing beam splitter, comprising:
   a polymeric multilayer reflective polarizing film comprising alternating layers of two polymeric materials, at least one of which is birefringent and orientated;
   a pressure sensitive adhesive disposed on the polymeric multilayer reflective polarizing film wherein the pressure sensitive adhesive has aggressive and permanent tack, adheres with no more than finger pressure, has sufficient ability to hold onto an adherand, has sufficient cohesive strength and requires no activation by an energy source; and
   a first rigid cover disposed on the pressure sensitive adhesive.

2. The polarizing beam splitter according to claim 1, further comprising a second rigid cover disposed adjacent to the polymeric multilayer reflective polarizing film.

3. The polarizing beam splitter according to claim 2, further comprising a structural adhesive disposed between the second rigid cover and the polymeric multilayer reflective polarizing film.

4. The polarizing beam splitter according to claim 2, wherein the first cover is a prism and the second cover is a prism.

5. The polarizing beam splitter according to claim 2, wherein the first cover is a glass prism and the second cover is a glass prism.

6. The polarizing beam splitter according to claim 1, wherein the pressure sensitive adhesive is substantially free of UV-absorbing chromophores.

7. The polarizing beam splitter according to claim 1, wherein the pressure sensitive adhesive is substantially free of unreacted monomers or substantially free of unreacted oligomers.

8. The polarizing beam splitter according to claim 1, wherein the multilayer reflective polarizing film is a matched z-index polarizer film.

9. A polarizing beam splitter, comprising:
   a first polymeric multilayer reflective polarizing film comprising alternating layers of two polymeric materials, at least one of which is birefringent and orientated;
   a second polymeric multilayer reflective polarizing film comprising alternating layers of two polymeric materials, at least one of which is birefringent and orientated, and proximate the first polymeric multilayer reflective polarizing film, wherein a major surface of the second polymeric multilayer reflective polarizing film faces a major surface of the first polymeric multilayer reflective polarizing film;
   an adhesive disposed between the first polymeric multilayer reflective polarizing film and the second polymeric multilayer reflective polarizing film;
   a first pressure sensitive adhesive disposed on the first polymeric multilayer reflective polarizing film;
   a first rigid cover disposed on the first pressure sensitive adhesive; and
   a second rigid cover disposed adjacent to the second polymeric multilayer reflective polarizing film wherein said first pressure sensitive adhesive has aggressive and permanent tack, adheres with no more than finger pressure, has sufficient ability to hold onto an adherand, has sufficient cohesive strength and requires no activation by an energy source.

10. The polarizing beam splitter according to claim 9, further comprising a structural adhesive disposed between the second rigid cover and the second polymeric multilayer reflective polarizing film.

11. The polarizing beam splitter according to claim 9, wherein the adhesive is a second pressure sensitive adhesive.

12. The polarizing beam splitter according to claim 9, wherein the adhesive is a structural adhesive.

13. The polarizing beam splitter according to claim 9, wherein the first cover is a prism and the second cover is a prism.

14. The polarizing beam splitter according to claim 9, wherein the first cover is a glass prism and the second cover is a glass prism.

15. The polarizing beam splitter according to claim 9, wherein the first pressure sensitive adhesive is substantially free of photo initiators.

16. The polarizing beam splitter according to claim 9, wherein the first pressure sensitive adhesive is substantially free of unreacted monomers or substantially free of unreacted oligomers.

17. The polarizing beam splitter according to claim 9, wherein the first multilayer reflective polarizing film is a matched z-index polarizer film and the second multilayer reflective polarizing film is a matched z-index polarizer film.

* * * * *

UNITED STATES PATENT AND TRADEMARK OFFICE
CERTIFICATE OF CORRECTION

| | |
|---|---|
| PATENT NO. | : 7,234,816 B2 |
| APPLICATION NO. | : 10/771863 |
| DATED | : June 26, 2007 |
| INVENTOR(S) | : Charles L. Bruzzone |

It is certified that error appears in the above-identified patent and that said Letters Patent is hereby corrected as shown below:

Title Page item 56
<u>Page 2,</u>
Column 2, Under Other Publications, Line 5, delete "May 16, 2006" and insert -- May 16, 2003 --, therefor.

<u>Column 8,</u>
Line 35, delete "source," and insert -- source. --, therefor.
Line 46, delete "aipha-olefin-," and insert -- alpha-olefin-, --, therefor.

<u>Column 13,</u>
Line 35, delete "(LCOS)" and insert -- (LCoS) --, therefor.

Signed and Sealed this

Thirtieth Day of October, 2007

JON W. DUDAS
*Director of the United States Patent and Trademark Office*